United States Patent
Hanks et al.

(10) Patent No.: US 9,964,333 B2
(45) Date of Patent: May 8, 2018

(54) SYSTEM AND METHOD FOR FURNACE FLUID FLOW MANAGEMENT

(71) Applicant: Trane International Inc., Piscataway, NJ (US)

(72) Inventors: Andrew Hamilton Hanks, Tyler, TX (US); Zhaohui Gu, Tyler, TX (US)

(73) Assignee: Trane International Inc., Piscataway, NJ (US)

(*) Notice: Subject to any disclaimer, the term of this patent is extended or adjusted under 35 U.S.C. 154(b) by 377 days.

(21) Appl. No.: 14/288,171

(22) Filed: May 27, 2014

(65) Prior Publication Data

US 2014/0352930 A1    Dec. 4, 2014

Related U.S. Application Data

(60) Provisional application No. 61/828,117, filed on May 28, 2013.

(51) Int. Cl.
| | |
|---|---|
| F28D 7/16 | (2006.01) |
| F28D 1/02 | (2006.01) |
| F24H 9/16 | (2006.01) |
| F28D 1/04 | (2006.01) |
| F28D 1/047 | (2006.01) |
| F28D 1/053 | (2006.01) |
| F24H 8/00 | (2006.01) |
| F28F 1/32 | (2006.01) |

(52) U.S. Cl.
CPC .............. *F24H 9/16* (2013.01); *F24H 8/00* (2013.01); *F28D 1/0461* (2013.01); *F28D 1/0477* (2013.01); *F28D 1/05316* (2013.01); *F28F 1/32* (2013.01); *Y02B 30/102* (2013.01)

(58) Field of Classification Search
CPC .............................. F28D 1/05316; F24H 9/16
USPC ........................................ 126/99 R; 165/168
See application file for complete search history.

(56) References Cited

U.S. PATENT DOCUMENTS

| | | | | |
|---|---|---|---|---|
| 4,848,314 A | * | 7/1989 | Bentley ................... | F28F 19/04 126/110 R |
| 5,178,124 A | * | 1/1993 | Lu ........................... | F24H 3/105 126/110 R |
| 5,347,980 A | * | 9/1994 | Shellenberger ......... | F24H 3/087 126/110 R |
| 5,406,933 A | * | 4/1995 | Lu ........................... | F24H 3/087 126/110 R |
| 5,448,986 A | * | 9/1995 | Christopher ............ | F24H 3/105 126/110 R |
| 5,480,678 A | * | 1/1996 | Rudolph .................. | C04B 35/83 118/715 |
| 5,482,027 A | * | 1/1996 | Stiller ...................... | F23K 1/04 110/106 |
| 6,006,741 A | * | 12/1999 | Daddis, Jr. .............. | F24H 3/087 126/110 R |

(Continued)

*Primary Examiner* — Avinash Savani
*Assistant Examiner* — Rabeeul Zuberi
(74) *Attorney, Agent, or Firm* — J. Robert Brown, Jr.; Conley Rose, P.C.

(57) ABSTRACT

A furnace has a primary heat exchanger tube, a secondary heat exchanger comprising a plurality of secondary heat exchanger tubes, a hot header configured to provide a fluid flow path between an output of the primary heat exchanger tube to an input of the secondary heat exchanger, and a perforated fluid flow plate disposed at least partially within the hot header.

18 Claims, 23 Drawing Sheets

(56) References Cited

U.S. PATENT DOCUMENTS

| | | | | |
|---|---|---|---|---|
| 8,393,318 | B2* | 3/2013 | Khan | F24H 3/087 |
| | | | | 126/114 |
| 8,826,901 | B2* | 9/2014 | Haydock | F23J 15/06 |
| | | | | 126/110 R |
| 2005/0092316 | A1* | 5/2005 | Schonberger, Sr. | F23M 9/06 |
| | | | | 126/110 R |
| 2007/0170272 | A1* | 7/2007 | Mukomilow | F24D 3/1066 |
| | | | | 237/19 |
| 2008/0006226 | A1* | 1/2008 | Takeda | F24H 1/40 |
| | | | | 122/18.1 |
| 2008/0314378 | A1* | 12/2008 | Khan | F24H 3/087 |
| | | | | 126/99 R |
| 2012/0247444 | A1* | 10/2012 | Sherrow | F24H 9/14 |
| | | | | 126/116 R |
| 2014/0352930 | A1* | 12/2014 | Hanks | F28D 1/0461 |
| | | | | 165/121 |

* cited by examiner

SYSTEM AND METHOD FOR FURNACE FLUID FLOW MANAGEMENT

CROSS-REFERENCE TO RELATED APPLICATIONS

The present application claims priority under 35 U.S.C. 119(e) to U.S. Provisional Patent Application No. 61/828,117 filed on May 28, 2013 by Hanks, et al. and entitled "System and Method for Furnace Fluid Flow Management," the disclosure of which is hereby incorporated by reference in its entirety.

BACKGROUND

Some heating, ventilation, and/or air conditioning (HVAC) systems comprise furnaces that generate condensation.

DETAILED DESCRIPTION

Figure 1:
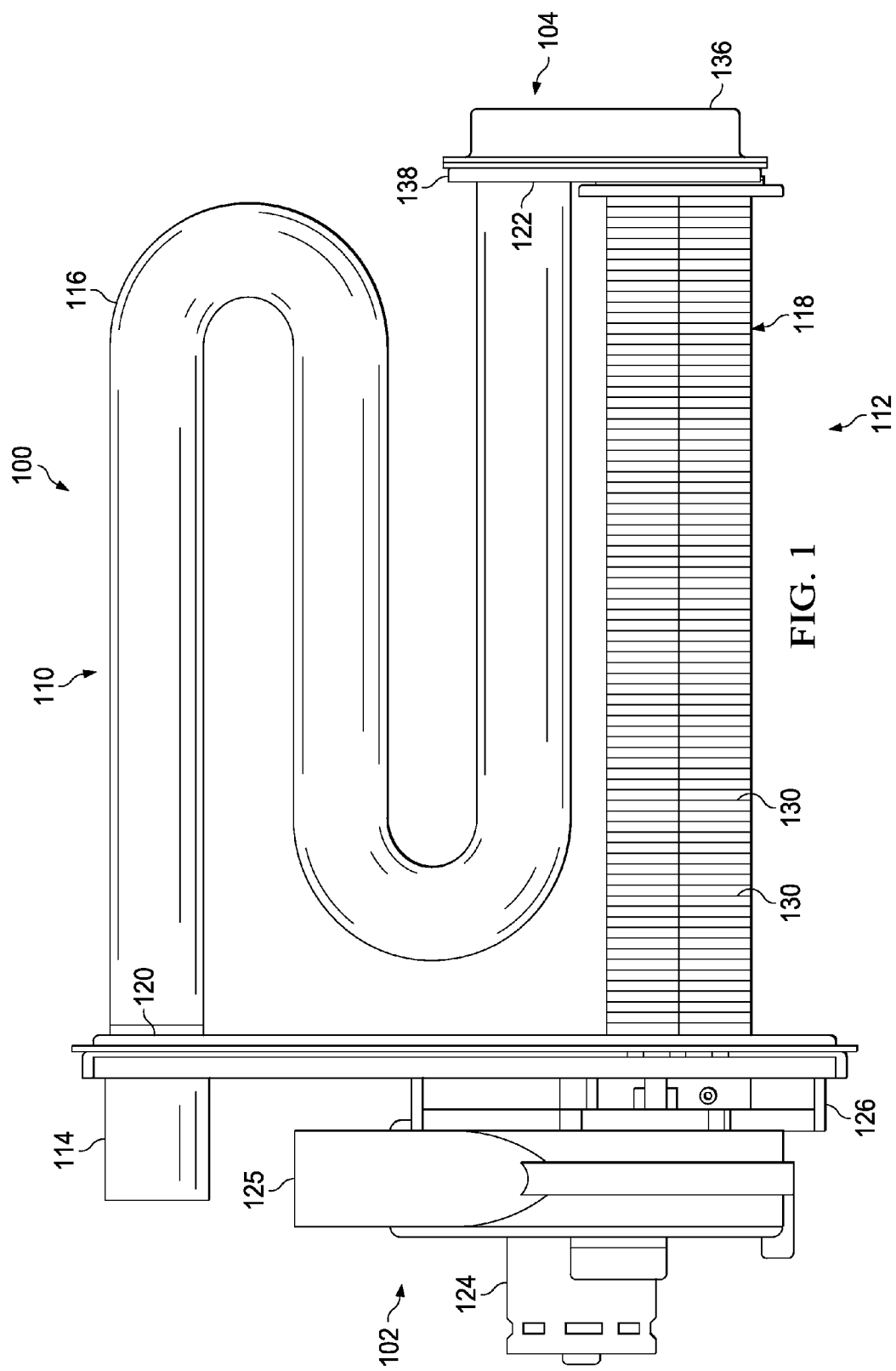
FIG. 1 is an orthogonal right side view of a furnace according to the disclosure.
Figure 2:
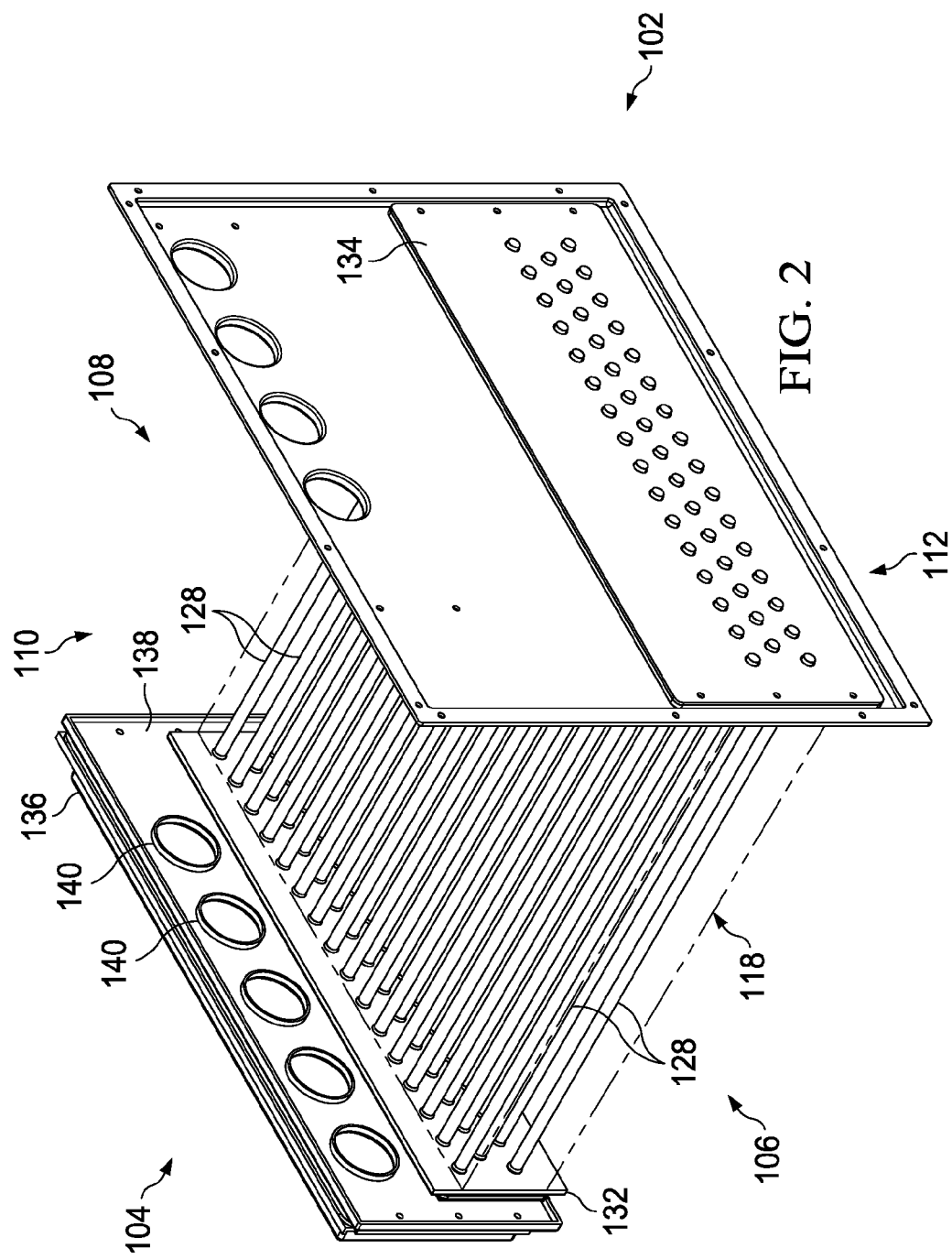
FIG. 2 is an oblique front-left view of a portion of the furnace of FIG. 1.
Figure 3:
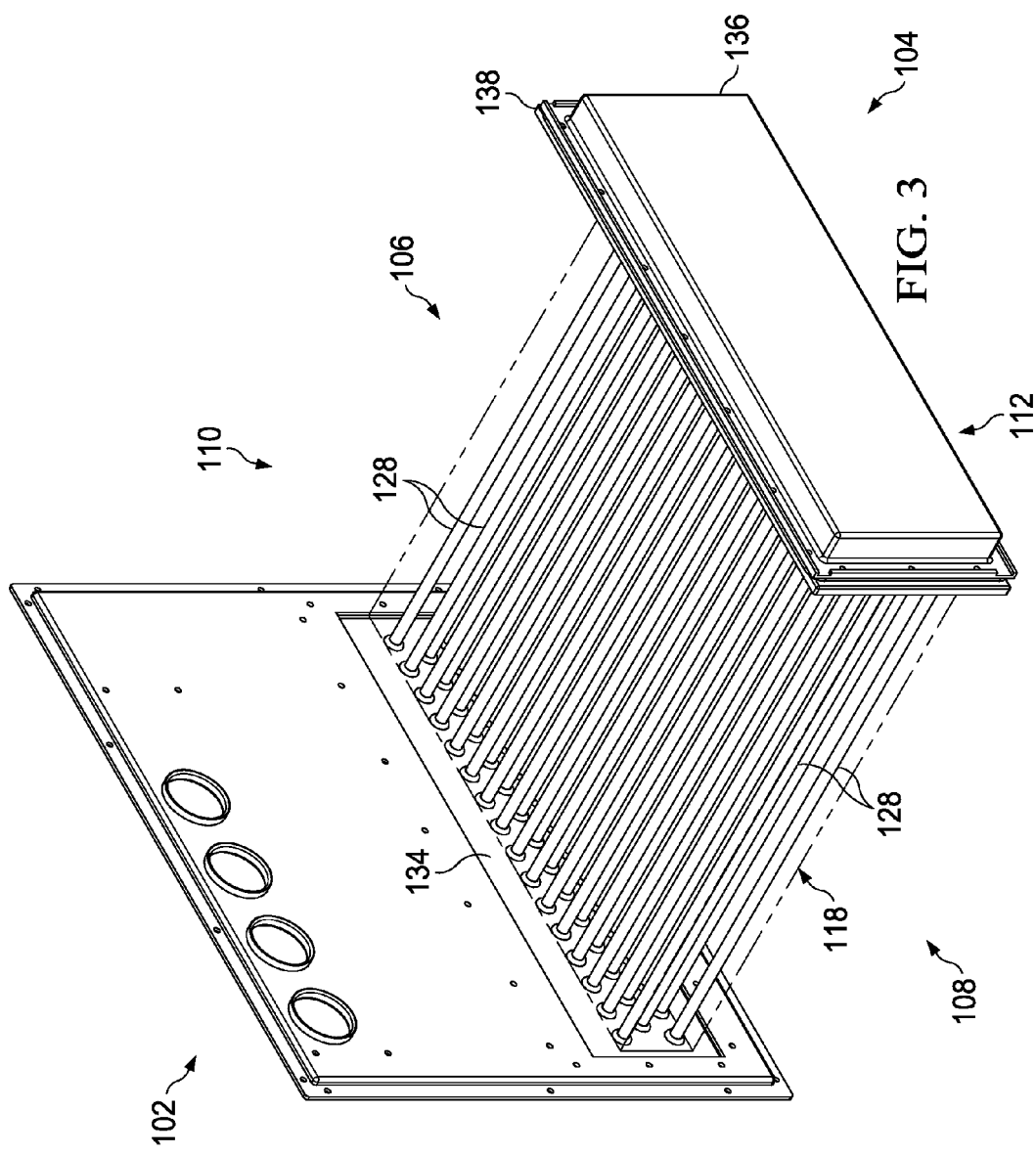
FIG. 3 is an oblique rear-right view of the portion of the furnace of FIG. 2.
Figure 4:
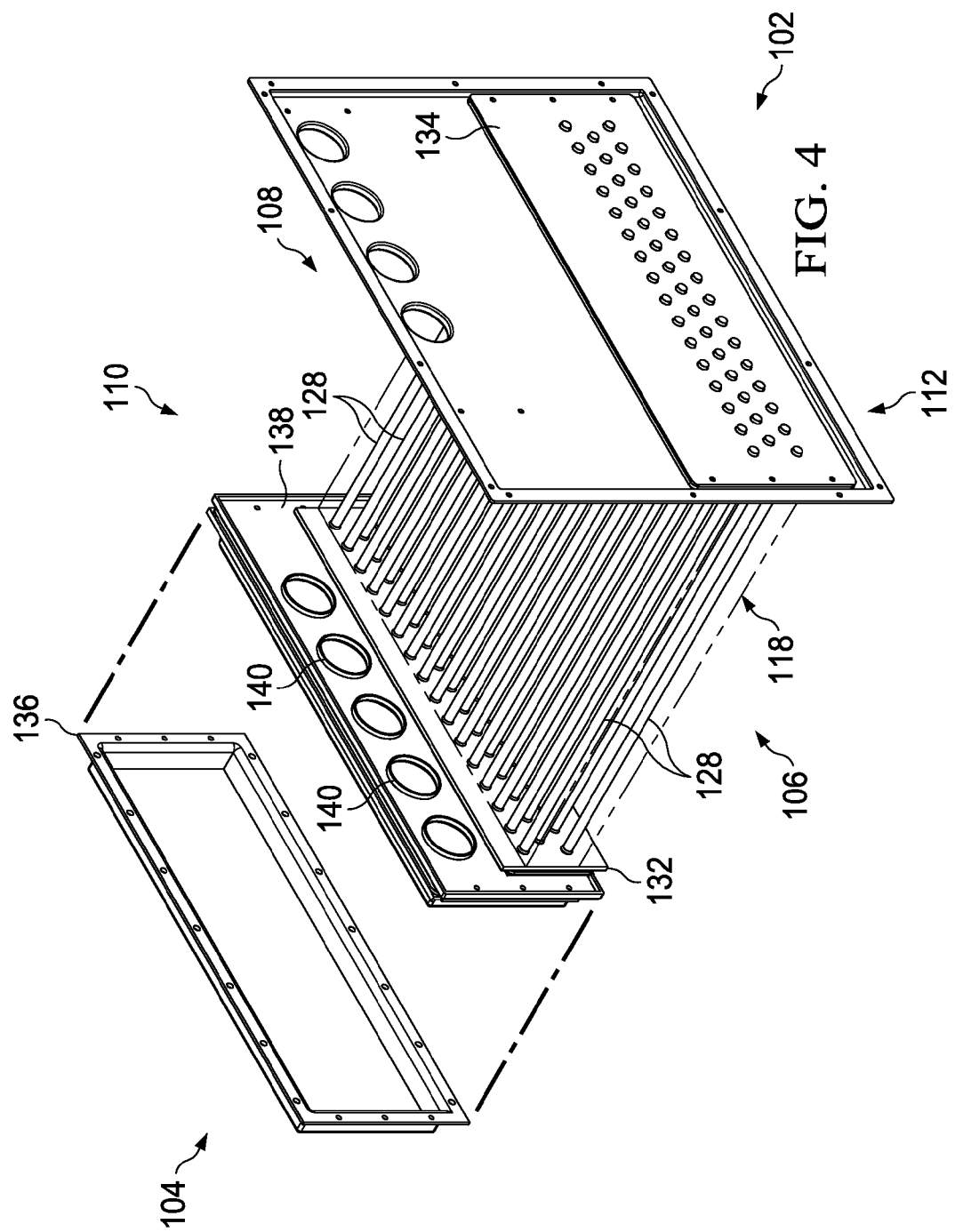
FIG. 4 is a partially exploded oblique front-left view of the portion of the furnace of FIG. 2.
Figure 5:
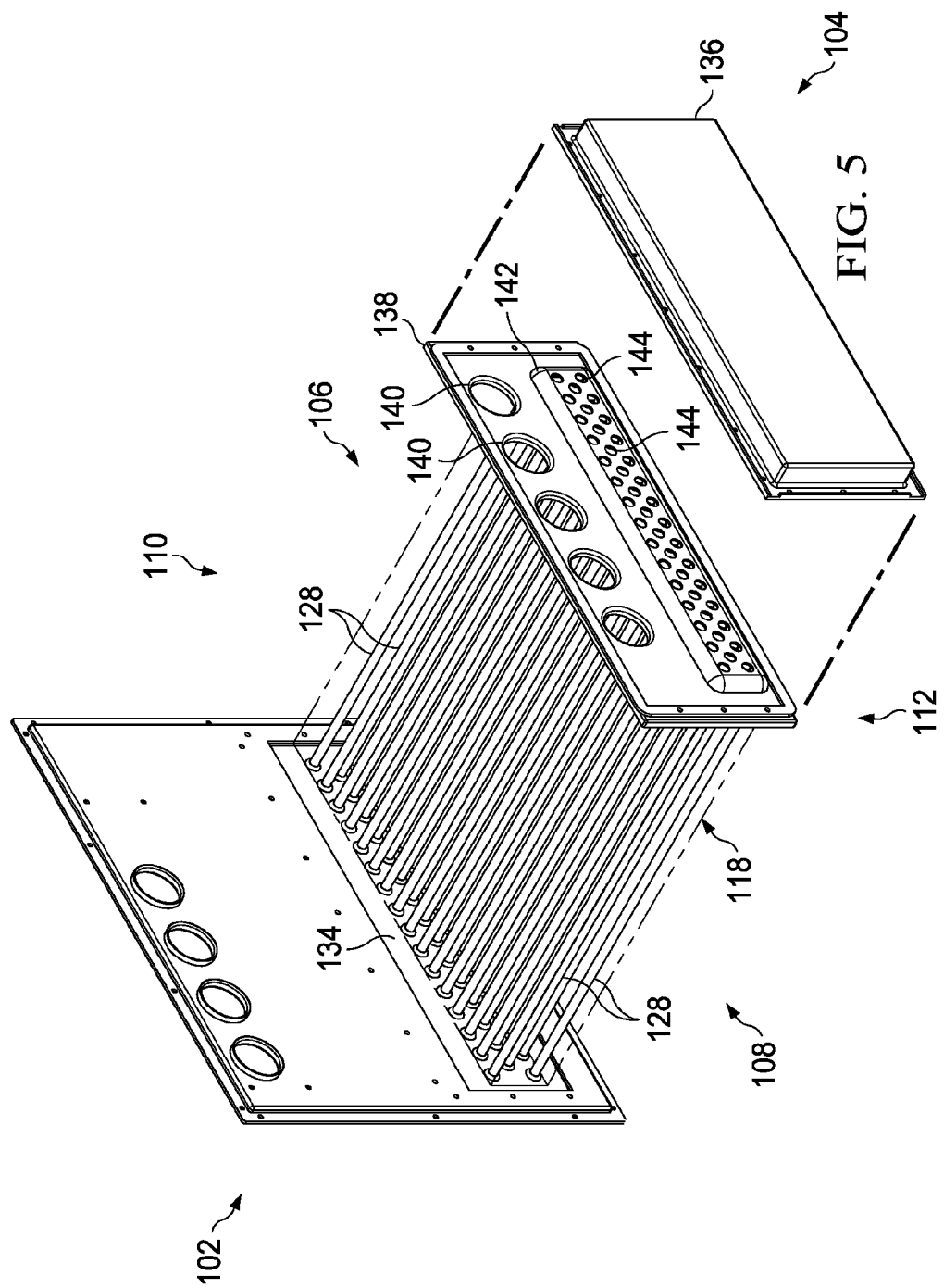
FIG. 5 is a partially exploded oblique rear-right view of the portion of the furnace of FIG. 2.
Figure 6:
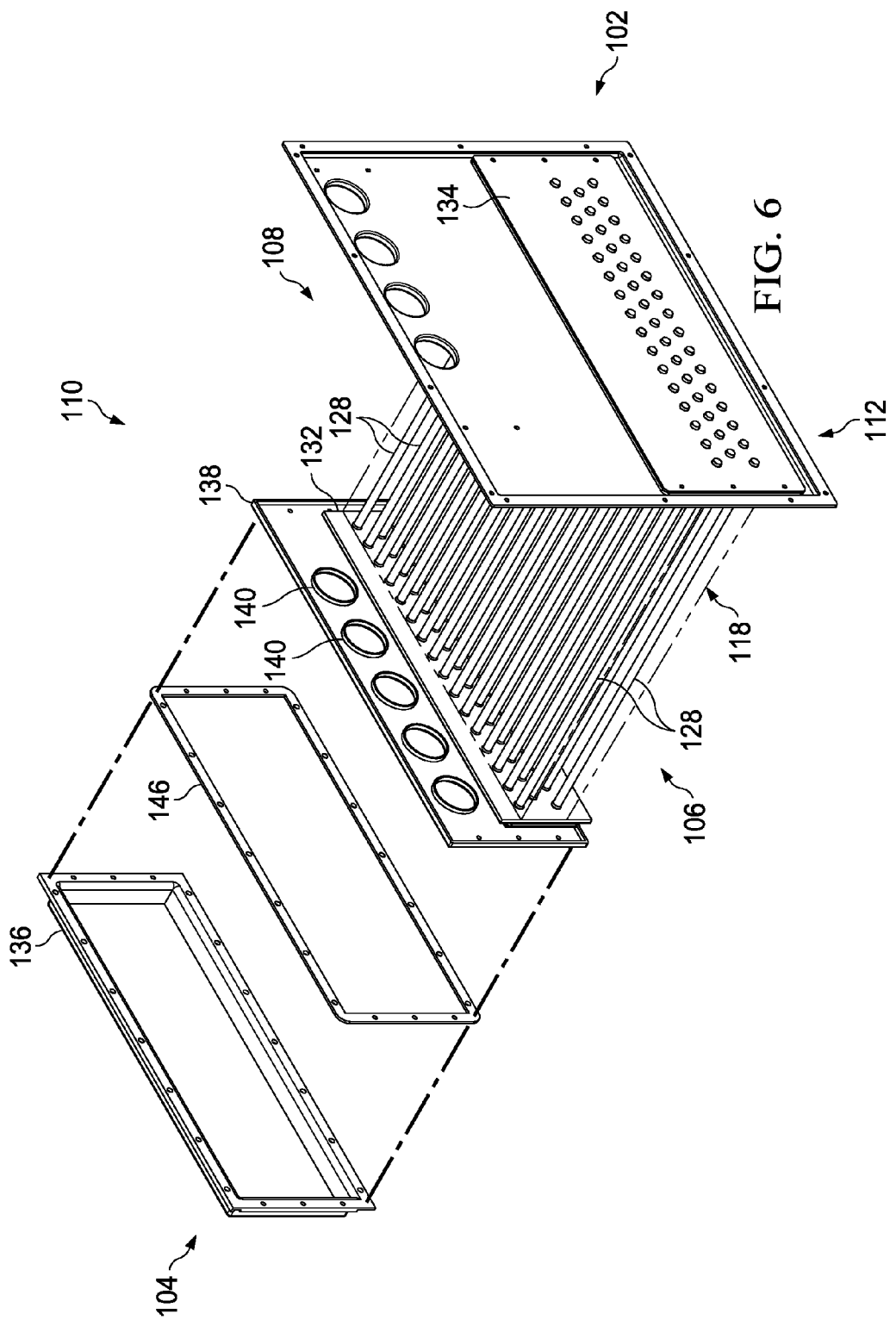
FIG. 6 is another partially exploded oblique front-left view of the portion of the furnace of FIG. 2.
Figure 7:
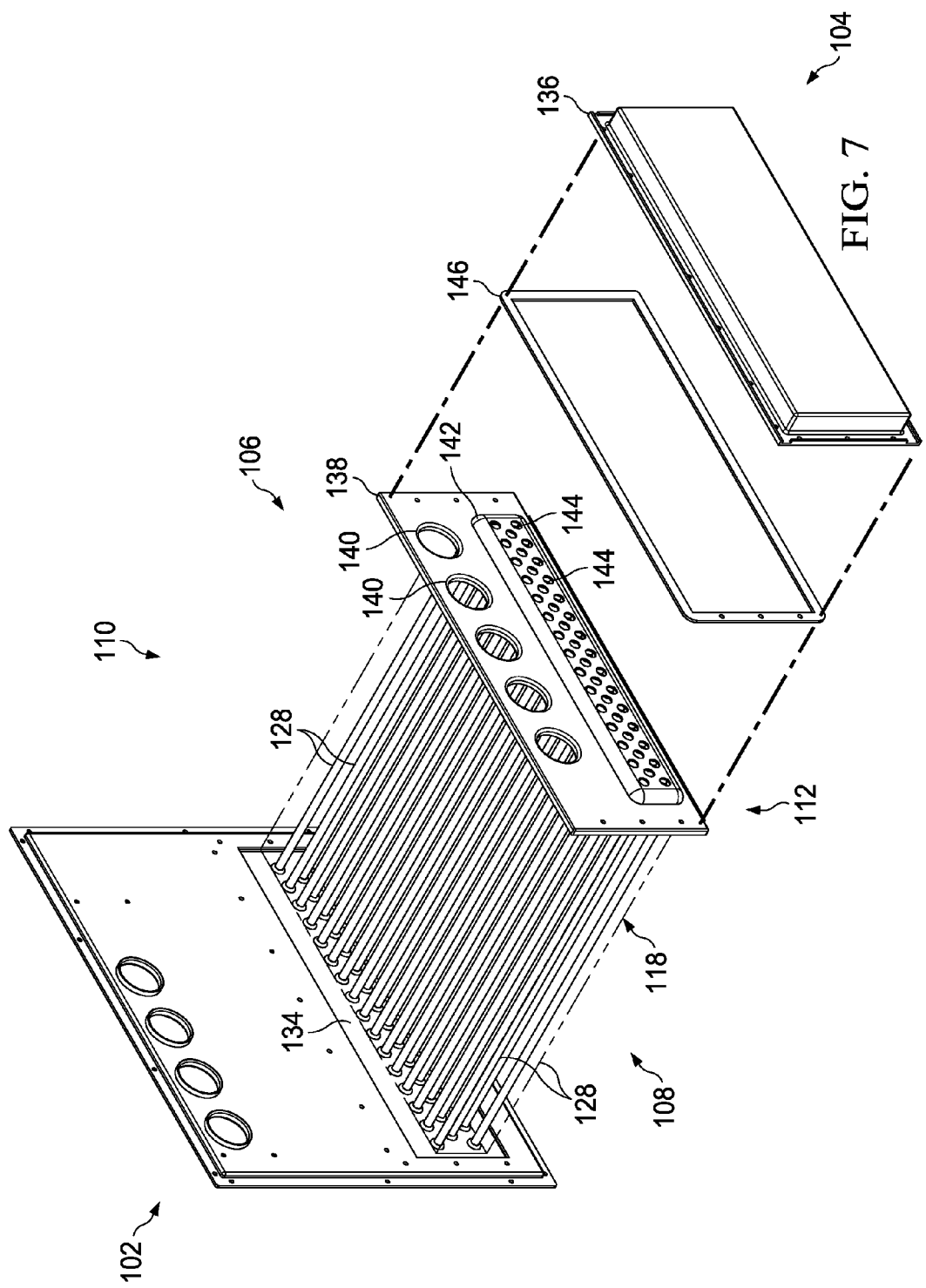
FIG. 7 is another partially exploded oblique rear-right view of the portion of the furnace of FIG. 2.
Figure 8:
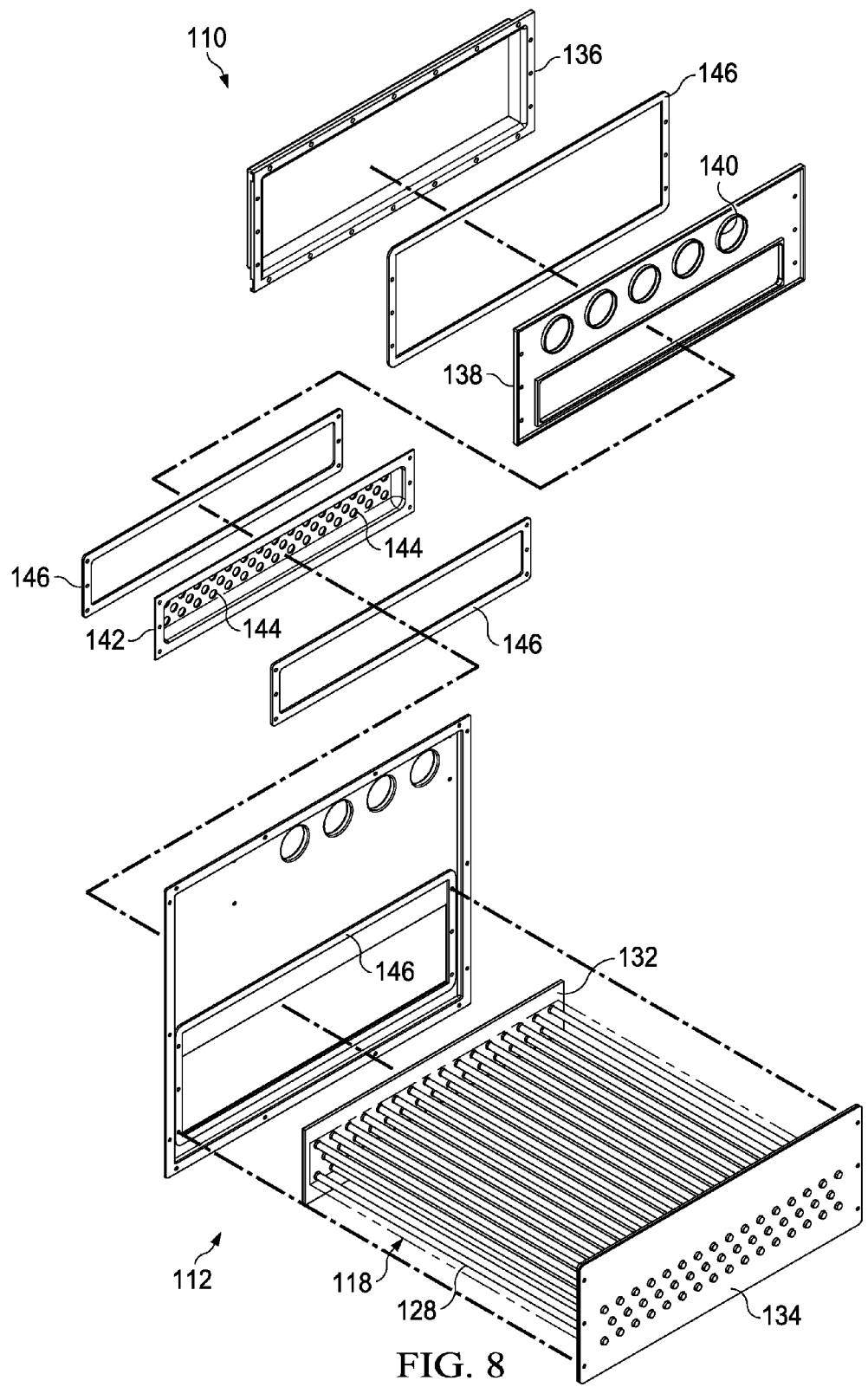
FIG. 8 is another partially exploded oblique front-left view of the portion of the furnace of FIG. 2.
Figure 9:
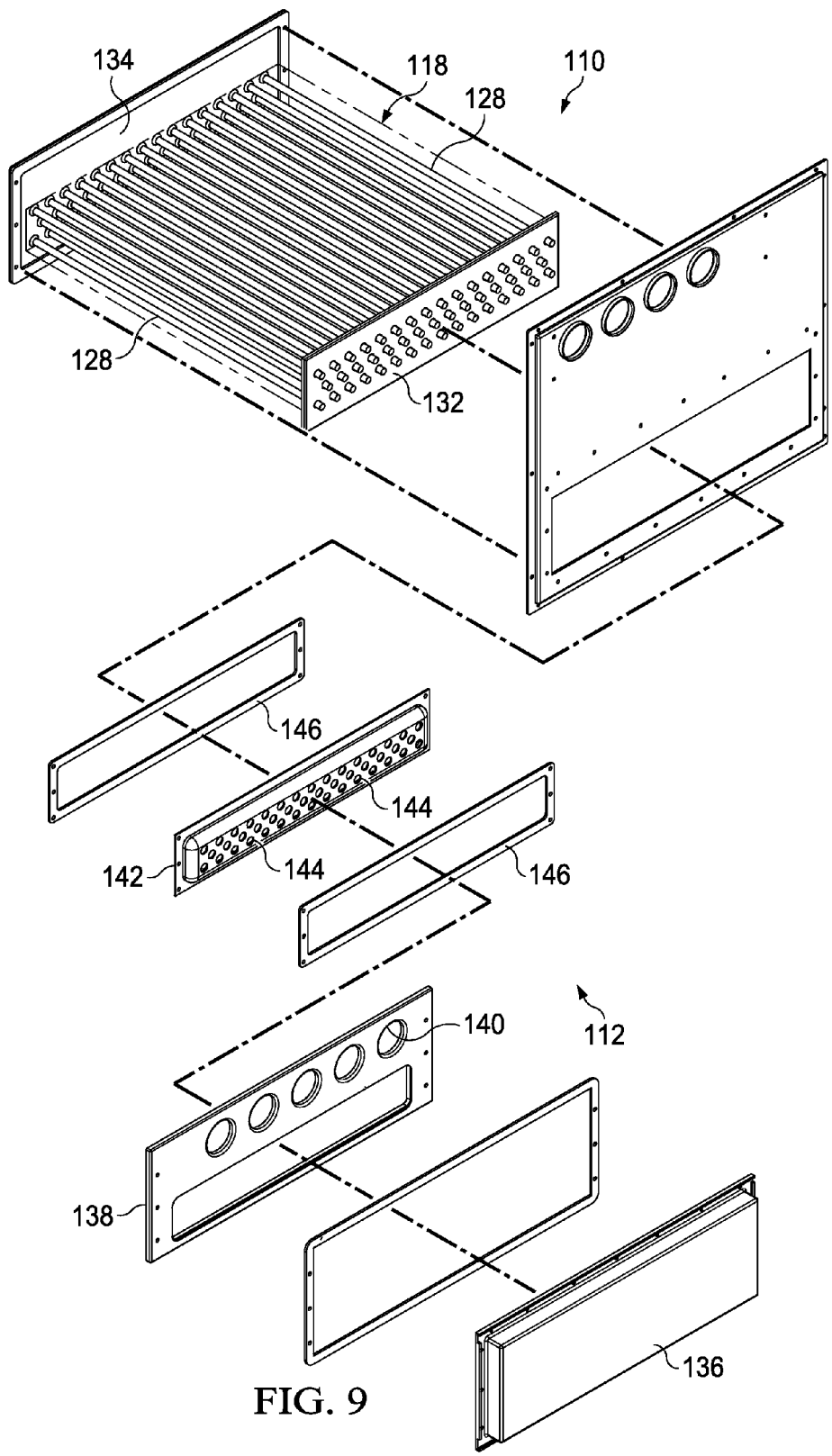
FIG. 9 is another partially exploded oblique rear-right view of the portion of the furnace of FIG. 2.
Figure 10:
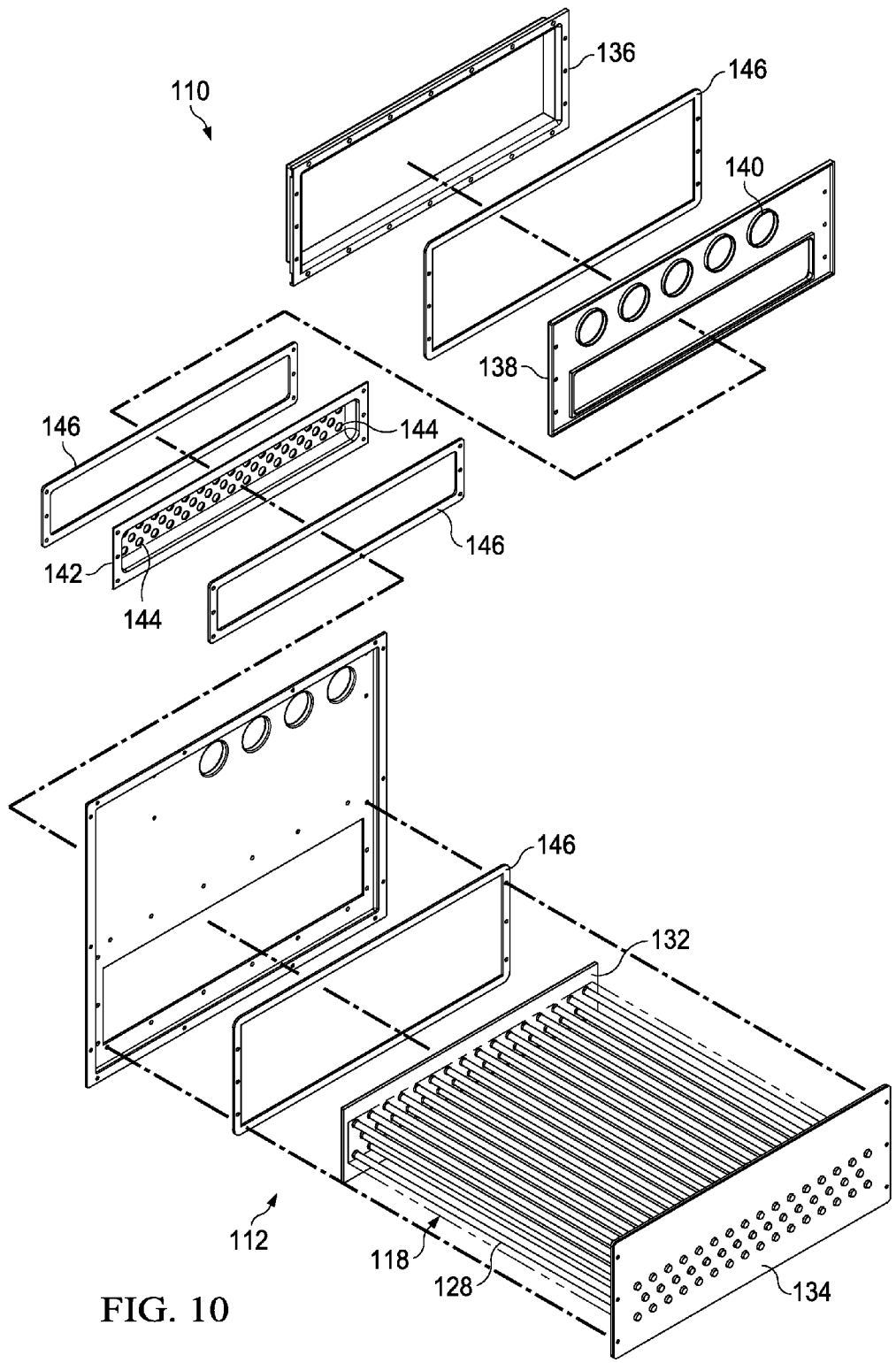
FIG. 10 is another partially exploded oblique front-left view of the portion of the furnace of FIG. 2.
Figure 11:
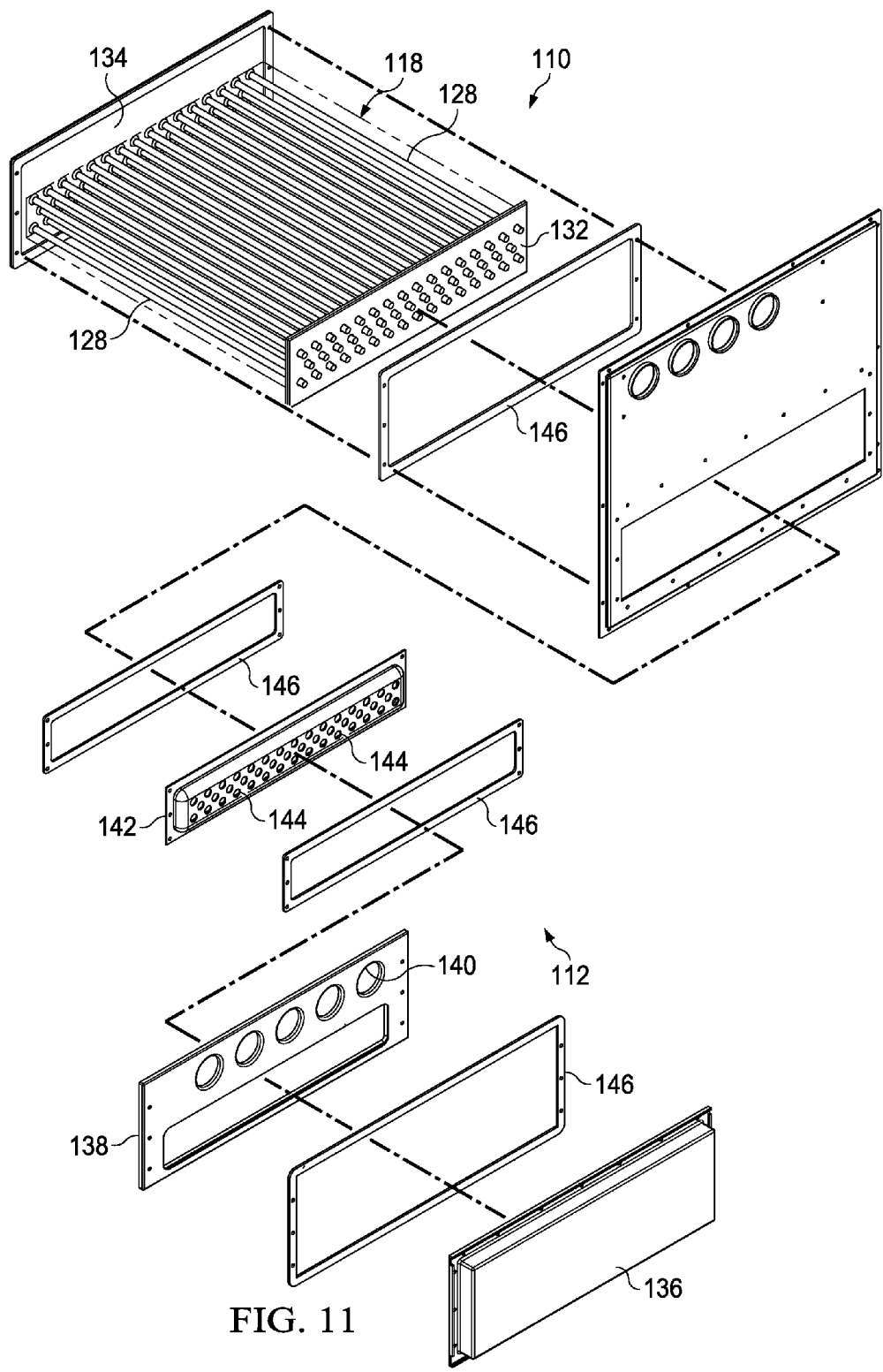
FIG. 11 is another partially exploded oblique rear-right view of the portion of the furnace of FIG. 2.
Figure 12:
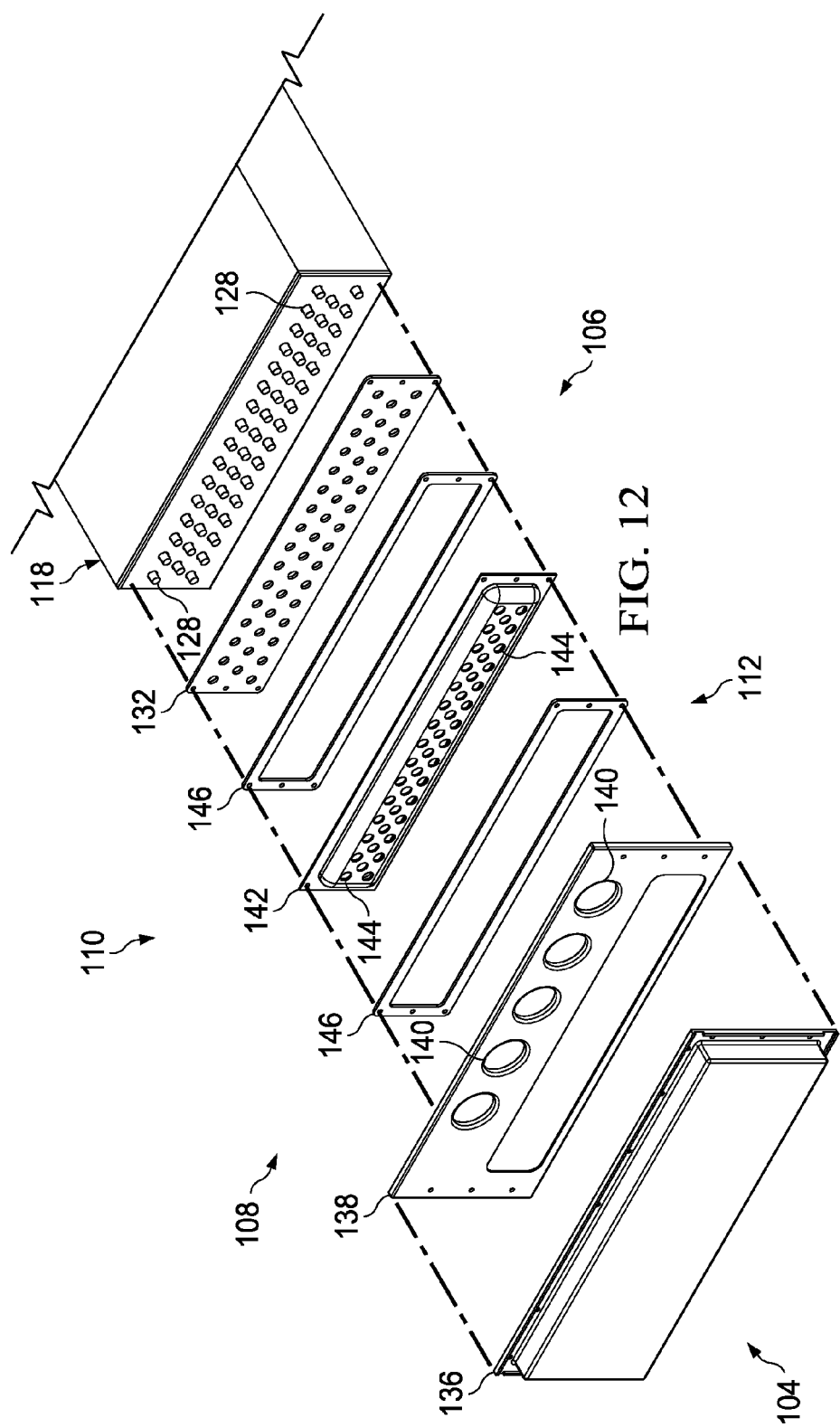
FIG. 12 is an oblique rear-left view of another portion of the furnace of FIG. 1.

Condensing furnaces may produce many gallons of condensate per hour, and that condensate may accumulate in the furnace and damage the furnace. In addition, standing condensate may promote bacterial growth. Further, repeated volatilization and/or evaporation of corrosive, acidic, and/or basic fluids may corrode and/or cause pitting of metallic components of a furnace. In some embodiments of this disclosure, a condensing gas-fired furnace is provided that manages fluid flow including hot combustion gasses and condensation.

Referring now to FIGS. 1-13, show a condensing gas-fired furnace 100 (in various stages of assembly/disassembly) according to an embodiment of the disclosure. In this embodiment, the furnace 100 is configured as an indoor furnace 100 that provides conditioned, heated air to an interior space. The components of the furnace 100, however, may be equally employed in an outdoor or weatherized furnace to condition an interior space. Moreover, the furnace 100 may be used in residential or commercial applications. The furnace 100 may generally comprise a front side 102, rear side 104, left side 106, right side 108, top side 110, and bottom side 112.

In this embodiment, the furnace 100 may comprise a burner assembly 114, a plurality of primary heat exchangers 116, and a finned, condensing, secondary heat exchanger 118. The primary heat exchangers 116 may extend from the burner assembly 114 to the secondary heat exchanger 118. In this embodiment, each burner assembly 114 may comprise an associated primary heat exchanger 116 for venting hot flue gases such that the primary heat exchanger 116 is in the combustion airflow path of its associated burner assembly 114. In general, the total number of burner assemblies 114 and/or heat exchangers 116 may vary depending upon the desired capacity of the furnace 100. Each primary heat exchanger 116 may comprise a bent, S-shaped tubular member that extends through a tortuous path to enhance the surface area available for heat transfer with the surrounding circulation air. Each primary heat exchanger 116 may comprise a first open end 120 defining a flue gas inlet and a second open end 122 defining a flue gas outlet. The second open end 122 of each primary heat exchanger 116 may feed the secondary heat exchanger 118 so that the primary heat exchangers 116 transport hot flue gases to the secondary heat exchanger 118. Although the primary heat exchangers 116 are tubular in some embodiments, the primary heat exchangers 116 may comprise, for example, clamshell, drum, shell and tube-type, and/or any other suitable type of heat exchangers.

In general, combustion air may be introduced into the furnace 100 either in induced draft mode by pulling air through the system or in forced draft mode by pushing air through the system. In this embodiment, induced draft mode may be employed by pulling the hot flue gases from the secondary heat exchanger 118 with a blower or fan 124 by creating a relatively lower pressure at the exhaust of the secondary heat exchanger 118. A control system may control the blower or fan 124 to an appropriate speed to achieve adequate air flow for a desired firing rate through the burner assemblies 114. Increasing the fan speed of the blower or fan 124 may introduce more air to the air/fuel mixture, thereby changing the characteristics of the combustion within the burner assemblies 114.

A circulation blower may blow circulation air across the primary heat exchangers 116 and the secondary heat exchanger 118 to enable the transfer of thermal energy from the primary heat exchangers 116 and the secondary heat exchanger 118 to the air. The heated, exiting airflow may then be distributed to a conditioned area. The furnace 100 is shown in a first orientation in which the circulation blower is nearer the bottom side 112 of the furnace 100 relative to the primary heat exchangers 116 and blows the circulation air across the primary heat exchangers 116 and up toward the top side 110 of the furnace 100.

While moving through the primary heat exchangers 116 and then the secondary heat exchanger 118, the hot flue gases may begin to cool and continue cooling as they move through the secondary heat exchanger 118, a cold header 126, and then the blower or fan 124. Finally, the flue gases may move through an exit pipe 125 and then through a flue pipe (not shown) to exit out of the flue pipe and to the outside environment. As the flue gases cool throughout the secondary heat exchanger 118, the flue gases may cool below a dew point temperature of the water vapor, which may be mixed with corrosive combustion products, producing a corrosive condensate. Accordingly, this system may be referred to as a condensing gas-fired furnace 100. The cold header 126 may provide a drainage path for managing and/or draining the condensate and/or any other liquid. In some cases, the condensate may form within and/or flow through tubes 128 of the secondary heat exchanger 118. The secondary heat exchanger 118 may further comprise fins 130, an input end plate 132, and an output end plate 134. The tubes 128 may comprise a corrosion resistant metal, such as, but not limited to 29-4C stainless steel, 2205 stainless steel, T140 aluminized steel, and/or any other suitable corrosion resistant material. The furnace 100 may further comprise a hot header cover 136 that joins to a hot side panel 138. The hot side panel 138 may comprise apertures 140 for receiving hot combustion gasses from the primary heat exchangers 116 into a space between the hot header cover 136 and the hot side panel 138.

Figure 13:
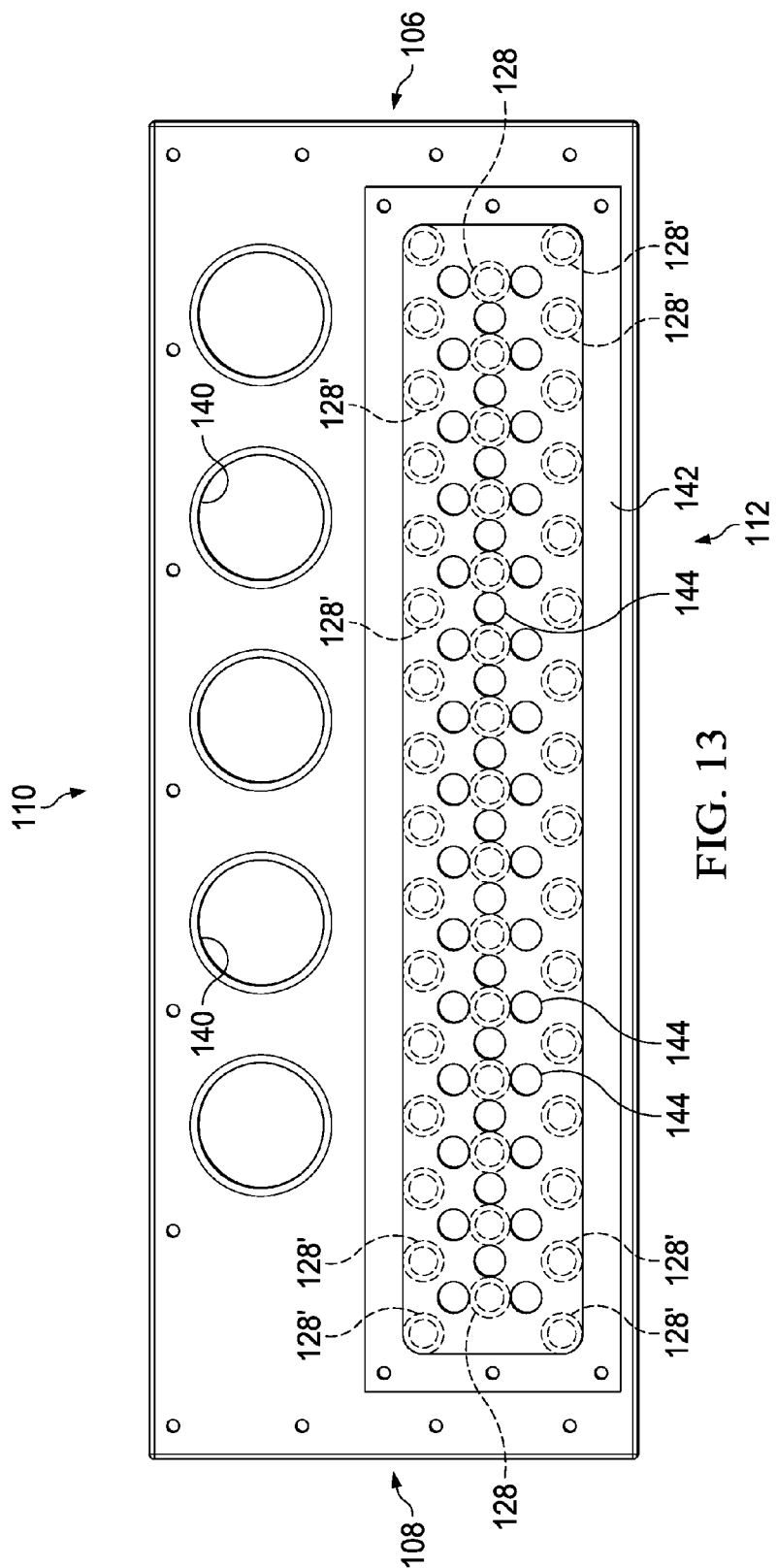
FIG. 13 is an orthogonal rear view of another portion of the furnace of FIG. 1.
Figure 14:
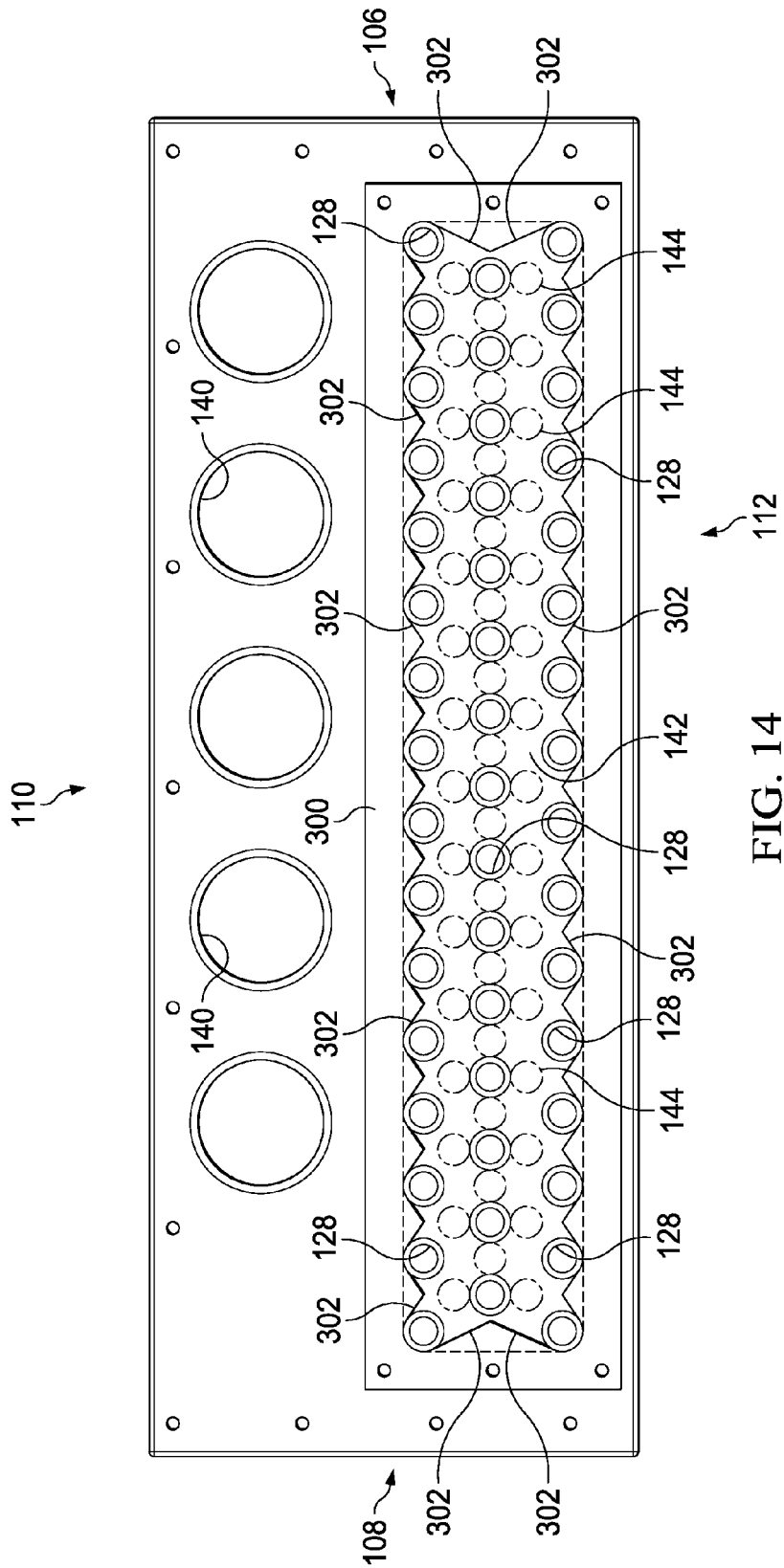
FIG. 14 is an orthogonal rear view of another portion of the furnace of FIG. 1 comprising an alternative embodiment of a gasket.

Further, a fluid flow plate 142 may be disposed between the secondary heat exchanger 118 and the hot header cover 136 so that fluid must pass through flow apertures 144 of the fluid flow plate 142 to pass from the hot header space bound by the hot header cover 136 and the secondary heat exchanger 118. In some embodiments, the flow apertures 144 are longitudinally (in a front-back direction) misaligned with the tubes 128 of the secondary heat exchanger 118 as shown in FIGS. 13 and 14. It will be appreciated that selection of the sizes of the various flow apertures 144, relative location of the flow apertures 144 relative to each other, the tubes 128, an intake of the fan 124 may affect a homogeneity of fluid flow distribution amongst the tubes 128 as well as upstream within the primary heat exchangers 116. This disclosure contemplates providing a plurality of the flow apertures 144 rather than a single large slot-like aperture in the fluid flow plate 142. In some embodiments, gaskets 146 may be used to seal between components and offset components. Gaskets 146 may comprise any suitable material configured to form a substantially fluid-tight seal between components, such as, but not limited to, silicone, plastic, and/or any other material configured to withstand relatively high temperatures, such as, but not limited to, up to about 850 degrees Fahrenheit.

Not only does the fluid flow plate 142 homogenize gaseous fluid flow, but the form, and shape of the fluid flow plate 142 may be selected to minimize and/or eliminate condensation collection and/or buildup within the fluid flow plate 142. As shown in FIG. 13 outermost located tubes 128' may be configured to abut the interior wall of the fluid flow plate 142 so that condensation that may enter the fluid flow plate 142 will be drained into the tubes 128' when the furnace 100 is properly installed. Further, in this embodiment, the temperatures of operation near the fluid flow plate 142 are such that condensation formation in and/or near the fluid flow plate 142 is minimized and/or eliminated when the furnace 100 is operating properly.

In some embodiments, the secondary heat exchanger 118 may be modular in nature insofar as it is removable from the primary heat exchangers 116 in a non-destructive manner. Particularly, in some embodiments, the hot side panel 138 of the secondary heat exchanger 118 may comprise fastener holes configured to receive fasteners such as, but not limited to, stainless steel screws, bolts, and/or any other suitable fastener that allows for relatively easy assembly and/or disassembly of the secondary heat exchanger 118 to a component, such as, but not limited to, a hot header cover 136 that forms a portion of the fluid flow path between the primary heat exchangers 116 and the secondary heat exchanger 118. The components of furnace 100 comprise other fastener holes that similarly aide in allowing the secondary heat exchanger 118 to be selectively removable from the primary heat exchangers 116 in a modular manner. The modular nature of the secondary heat exchanger 118 being easily removable from the primary heat exchanger 116 and/or the components that join the secondary heat exchanger 118 to the primary heat exchanger 116 allow for replacement and/or repair of the secondary heat exchanger 118 without the need to replace the primary heat exchanger 116.

Referring now to FIG. 14, an embodiment of a guide gasket 300 is shown. The guide gasket 300 may comprise any suitable material configured to form a substantially fluid-tight seal between at least one of the tubes 128 and the fluid flow plate 142. The guide gasket 300 is configured to comprise inclined surfaces 302 such that any introduction of condensation or liquid into the fluid flow plate 142 will be guided by gravity to the outermost tubes 128 and so that the lowest available space within the fluid flow plate 142, regardless of orientation, is a surface configured to drain liquid out of the fluid flow plate 142 and into tubes 128. In some embodiments, the guide gasket 300 may fill an interior volume of the fluid flow plate 142 so that when the furnace 100 is substantially properly oriented relative to gravity, any flowing liquids are guided along the guide gasket 300 into a tube 128 and so that liquids are not allowed to pool, stagnate, and/or otherwise remain within the fluid flow plate 142.

Figure 15:
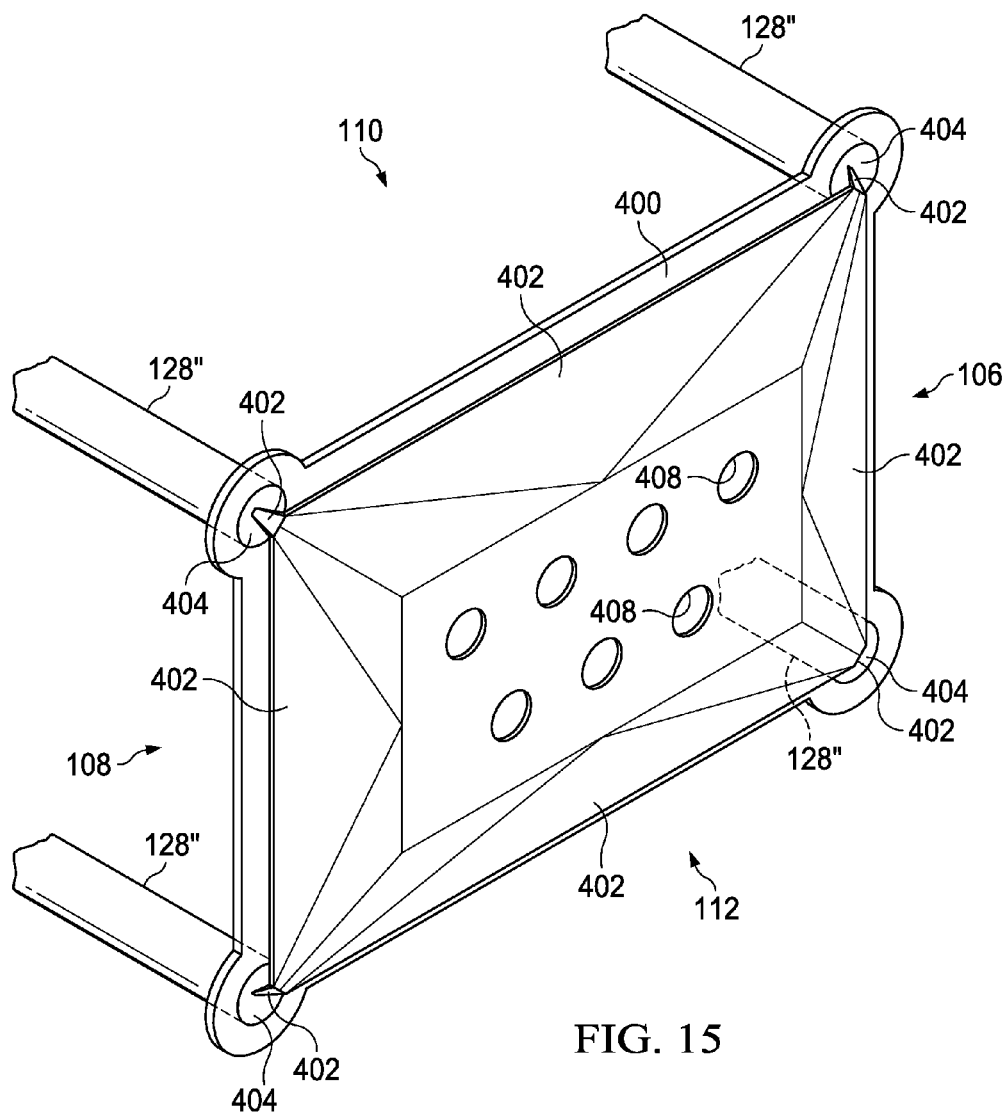
FIGS. 15-17 are oblique views of alternative embodiments of perforated fluid flow plates.

FIG. 15 is an alternative embodiment of a fluid flow plate 400 that is configured to comprise integral inclined surfaces 402 that are configured to drain liquids to liquid outlets 404 that may be connected to tubes 128". The fluid flow plate 400 further comprises flow apertures 408 configured to allow combustion fluids therethrough.

Figure 16:
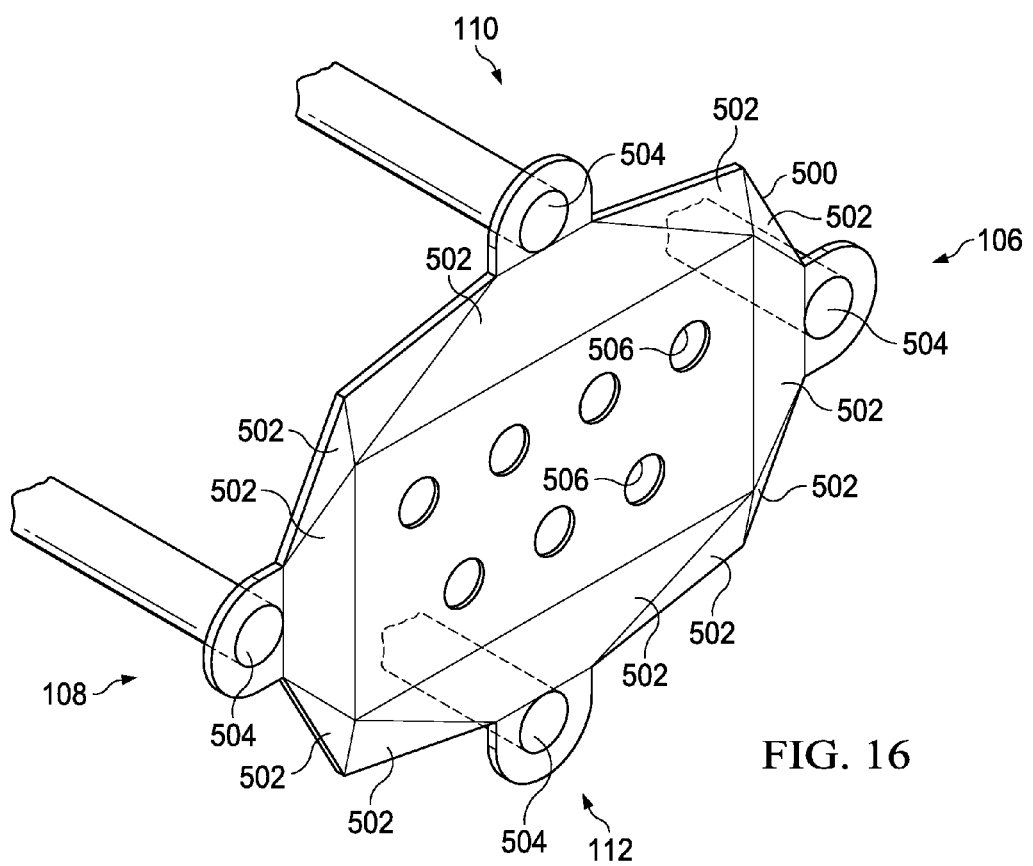

FIG. 16 is an alternative embodiment of a fluid flow plate 500 that is configured to comprise integral inclined surfaces 502 that are configured to drain liquids to liquid outlets 504 that may be connected to tubes such as tubes 128". The fluid flow plate 500 further comprises flow apertures 506 configured to allow combustion fluids therethrough.

With regard to each of the fluid flow plates 142, 400, 500 and the guide gasket 300, at least four substantially orthogonal orientations for the furnace 100 are contemplated, each with the front 102 and back 104 remaining generally parallel to the ground so that gravity can draw liquids out of the fluid flow plates 142, 400, 500 and the guide gasket 300 in a variety of orientations.

Figure 17:
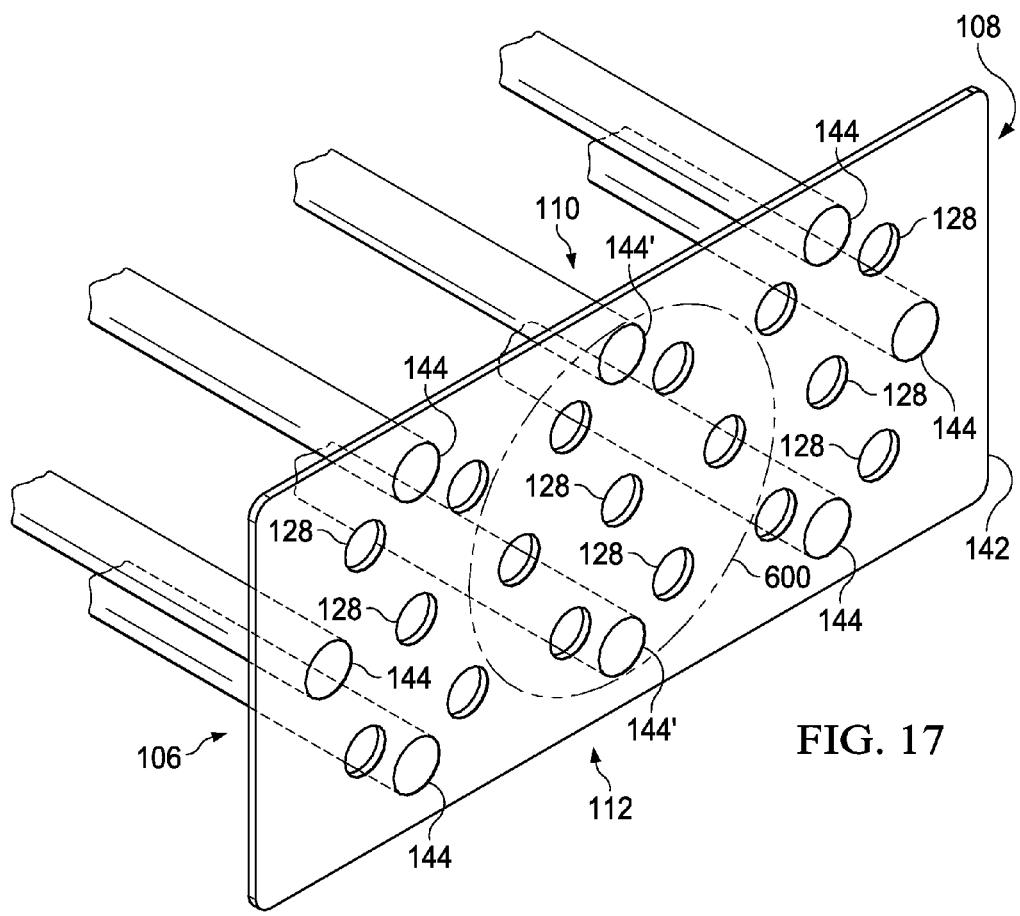

Referring now to FIG. 17, a schematic front view of a fluid flow plate 142 is shown as comprising apertures 144. However, in some embodiments, apertures 144' which may be directly longitudinally within a profile or longitudinal footprint 600 of a fan 124 inlet may not be provided. In some cases, by not providing apertures 144' longitudinally aligned with the longitudinal footprint 600, fluid flow through the apertures 144 of the fluid flow plate 142 may be forced to homogenize and/or otherwise more equally distribute in mass flow rate through the apertures 144.

Figure 18:
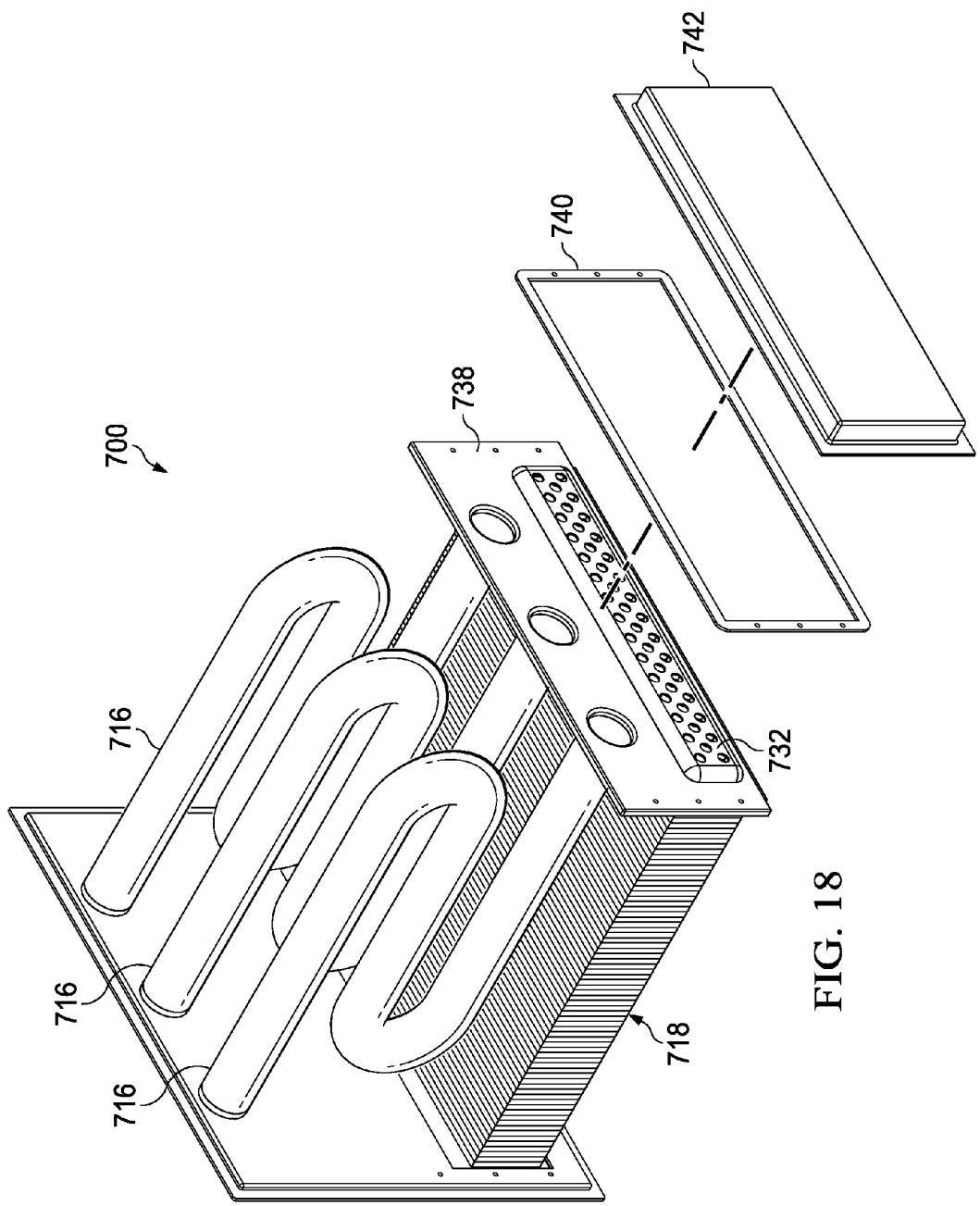
FIGS. 18-20 are oblique partially exploded, orthogonal cutaway right side, and an orthogonal right side detail views, respectively, of alternative embodiment of a furnace according to the disclosure.
Figure 19:
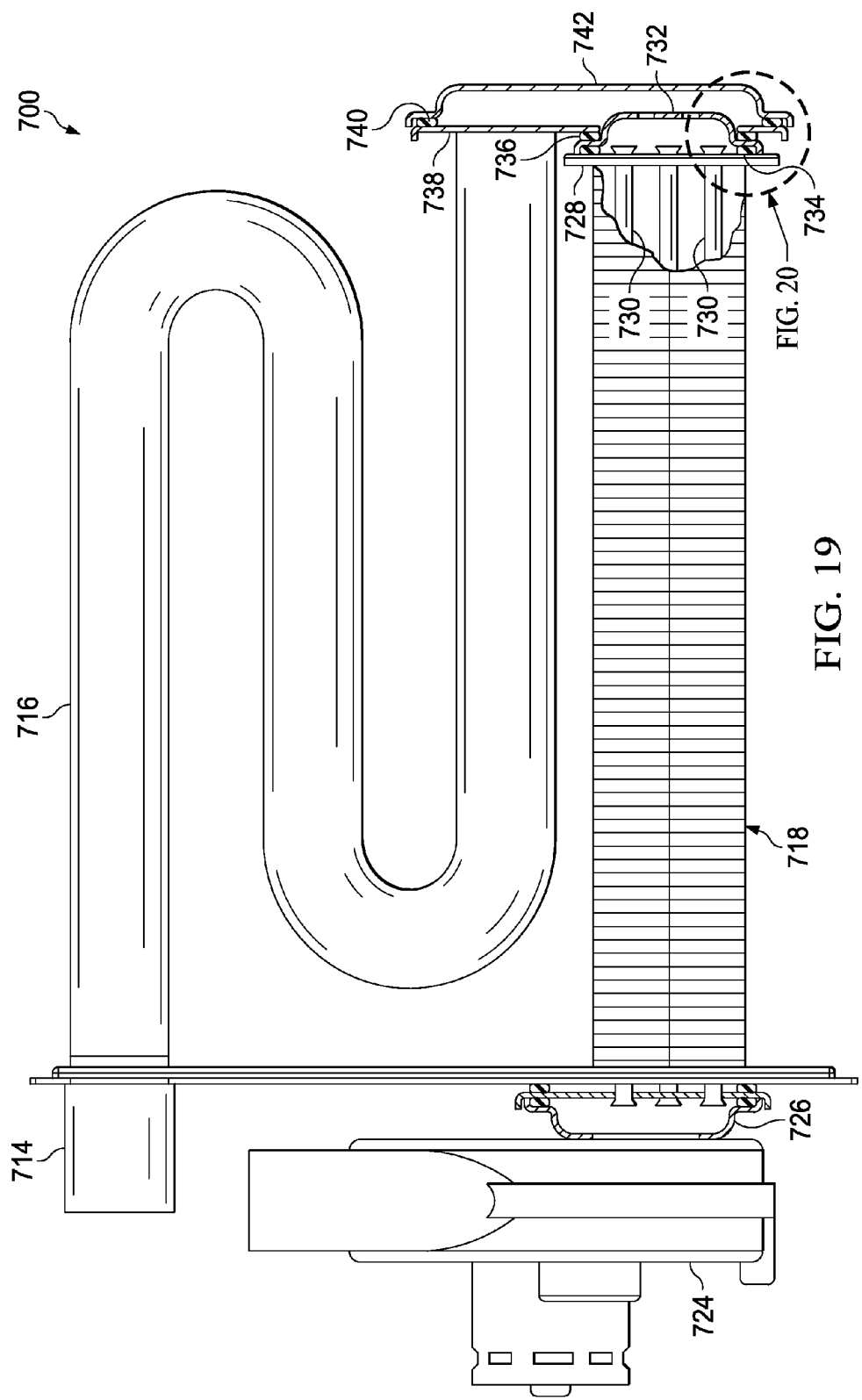
Figure 20:
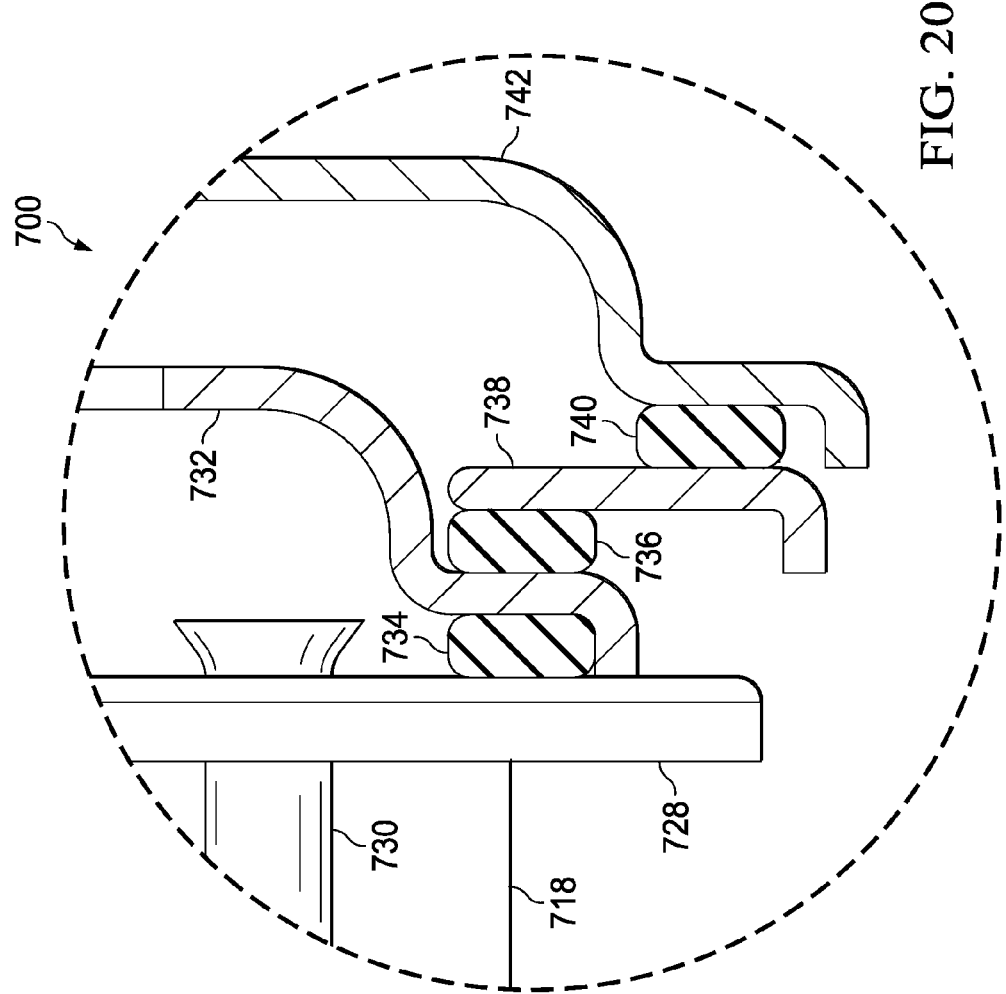

Referring now to FIGS. 18-20, an oblique partially exploded view, an orthogonal cutaway right side view, and an orthogonal right side detail view of alternative embodiment of a furnace 700 are shown, respectively. The furnace 700 is substantially similar to furnace 100 insofar as it generally comprises burner assemblies 714, primary heat exchangers 716, a secondary heat exchanger 718, a fan 724, and a cold header 726. This embodiment comprises a secondary heat exchanger header plate 728 to which secondary heat exchanger tubes 730 are joined and/or through which secondary heat exchanger tubes 730 extend through. In this embodiment, the secondary heat exchanger tubes 730 extend through the secondary heat exchanger header plate 728 and are flanged on the ends and/or swaged. In this embodiment, a perforated cover plate 732 is captured between a first seal 734 and a second seal 736. The first seal 734 is captured between the header plate 728 and the perforated cover plate 732. The second seal 736 is captured between the perforated cover plate 732 and a hot header primary plate 738. A third seal 740 is captured between the hot header primary plate 738 and a hot header collector box 742. In some cases, the above-described embodiment may lower air flow noise as a function of an increased distance provided between a circulation blower outlet and the secondary heat exchanger 718. In some cases, the above-described embodiment may provide for an increased vertical height differential between the rear and front ends of the secondary heat exchanger tubes 730 so that condensate drainage is improved and/or better provided for. In some cases, the above-described embodiment may provide a relatively smaller overall furnace. In some cases, the above-described embodiment may be configured so that only insignificant amounts of condensate or no condensate forms on the hot side of the secondary heat exchanger 718, namely, within a space generally bounded by the perforated cover plate 732. In some cases, the above-described secondary heat exchanger header plate 728 may comprise a substantially plain plate of material requiring no special tooling.

Figure 21:
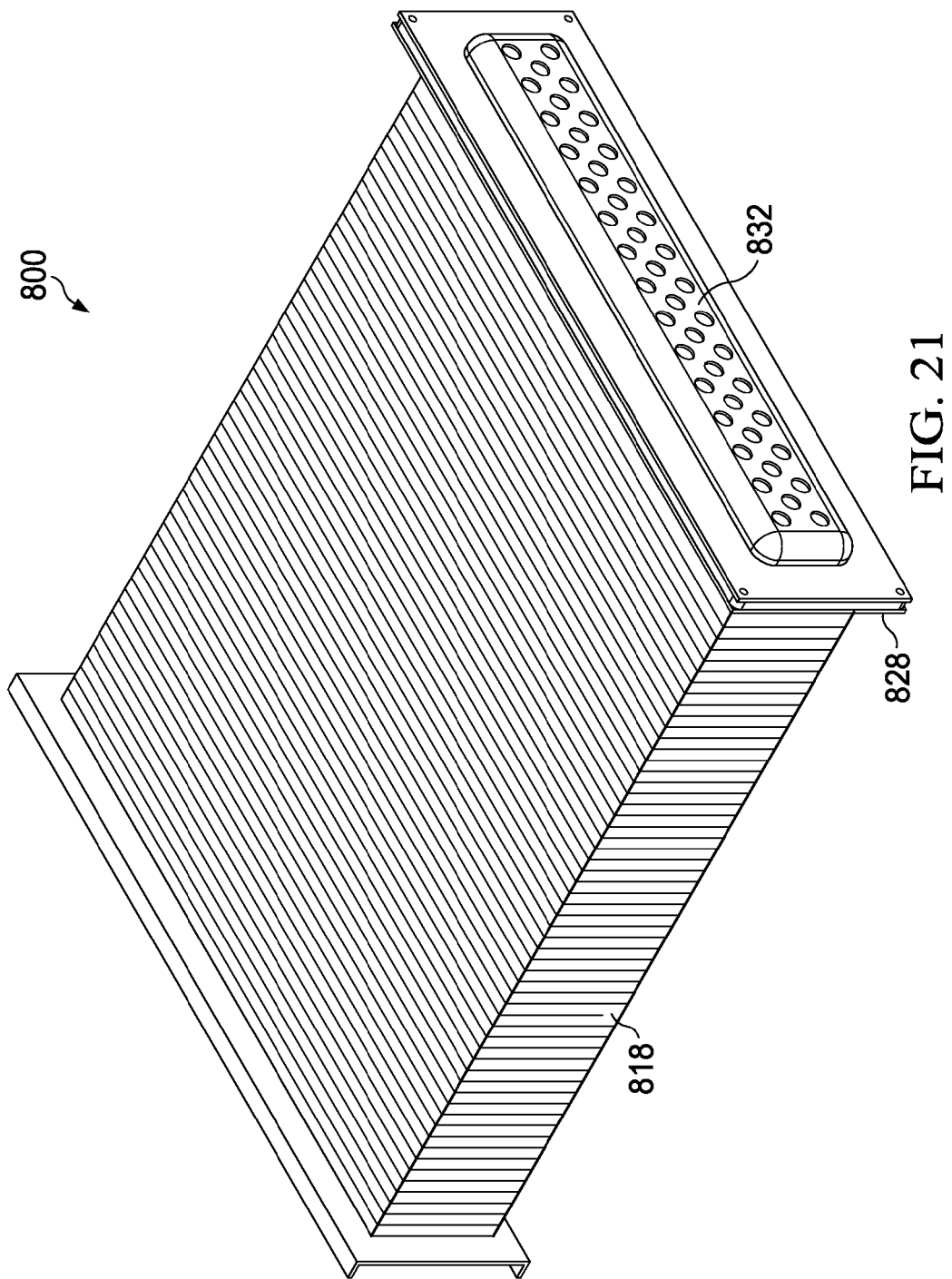
FIGS. 21-23 are oblique partial, oblique partially exploded, and orthogonal right side views, respectively, of another alternative embodiment of a furnace according to the disclosure.
Figure 22:
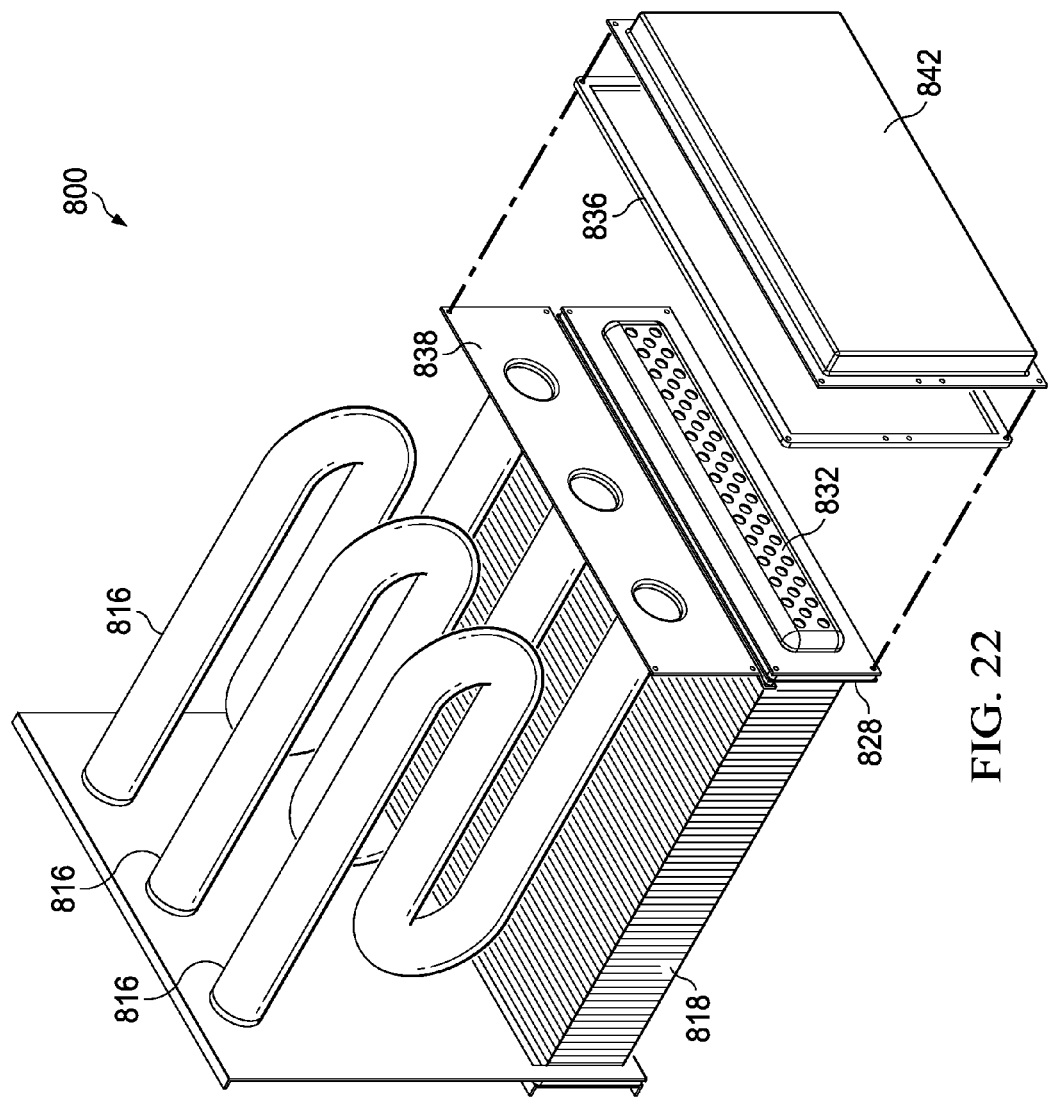
Figure 23:
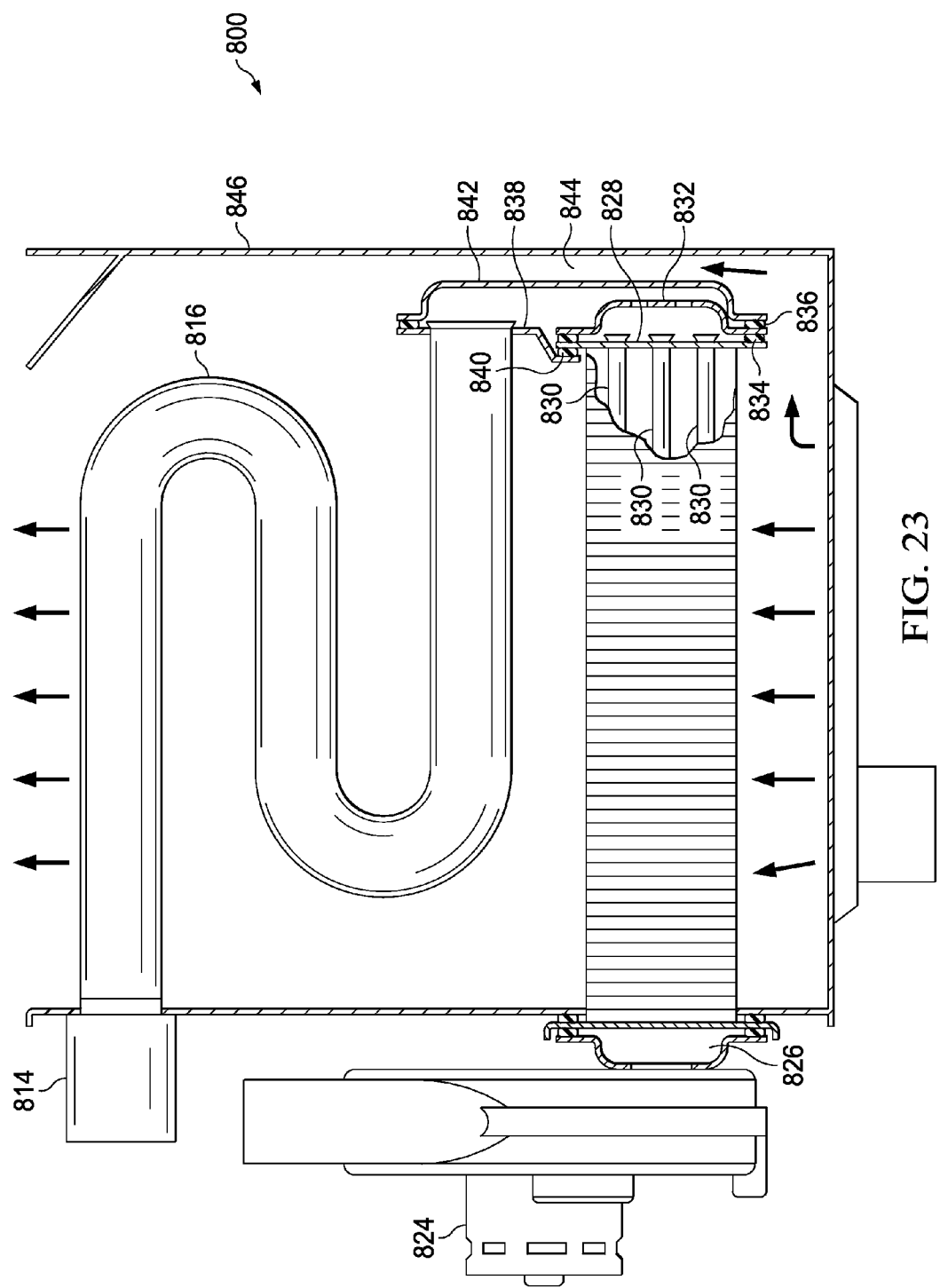

Referring now to FIGS. 21-23, an oblique partial view, an oblique partially exploded view, and an orthogonal right side view of alternative embodiment of a furnace 800 are shown, respectively. The furnace 800 is substantially similar to furnace 100 insofar as it generally comprises burner assemblies 814, primary heat exchangers 816, a secondary heat exchanger 818, a fan 824, and a cold header 826. This embodiment comprises a secondary heat exchanger header plate 828 to which secondary heat exchanger tubes 830 are joined and/or through which secondary heat exchanger tubes 830 extend through. In this embodiment, the secondary heat exchanger tubes 830 extend through the secondary heat exchanger header plate 828 and are flanged on the ends and/or swaged. In this embodiment, a perforated cover plate 832 is captured between a first seal 834 and a second seal 836. The first seal 834 is captured between the header plate 828 and the perforated cover plate 832. The second seal 836 is captured between a lower portion of the perforated cover plate 832 and a hot header collector box 842 as well as between the hot header collector box 842 and an upper portion of a hot header primary plate 838. A third seal 840 is captured between the hot header primary plate 838 and the secondary heat exchanger header plate 828. In some cases, the above-described embodiment may allow improved redirection of circulation air from the circulation blower output to cool the hot header collector box 842 by increasing flow through a space 844 behind the hot header collector box 842.

Further, the above-described embodiment may allow less expensive insulation to be utilized within a cabinet 846 of the furnace 800.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A furnace, comprising:
   a primary heat exchanger tube;
   a secondary heat exchanger comprising a plurality of secondary heat exchanger tubes;
   a hot header configured to provide a fluid flow path between an output of the primary heat exchanger tube to an input of the secondary heat exchanger; and
   a perforated fluid flow plate disposed at least partially within the hot header, wherein the perforated fluid flow plate comprises an interior wall comprising:
      a first portion distance from the secondary hear exchanger tubes, the first portion comprising a plurality of perforations that are misaligned relative to the secondary heat exchanger tubes; and
      a second portion abutting one or more of the secondary heat exchanger tubes to provide a fluid flow path from the hot header to the one or more of the secondary heat exchanger tubes.

2. The furnace of claim 1, wherein the perforated fluid flow plate comprises a profile configured to minimize pooling of condensate within the hot header.

3. The furnace of claim 1, further comprising a seal configured to minimize pooling of condensate within the hot header.

4. The furnace of claim 1, further comprising a seal that extends over both the perforated fluid flow plate and a primary plate of the hot header.

5. The furnace of claim 4, wherein the primary plate of the hot header is associated with an output end of the primary heat exchanger tube.

6. The furnace of claim 5, further comprising a seal between a header plate of the secondary heat exchanger and the perforated fluid flow plate.

7. The furnace of claim 6, further comprising a seal between the primary plate of the hot header and the header plate of the secondary heat exchanger.

8. The furnace of claim 1, further comprising a gasket disposed within the perforated fluid flow plate.

9. The furnace of claim 8, wherein the gasket is configured to minimize pooling of condensate within a space bounded by the perforated fluid flow plate.

10. A heating, ventilation, and/or air conditioning (HVAC) system, comprising:
- a primary heat exchanger tube;
- a secondary heat exchanger comprising a plurality of secondary heat exchanger tubes;
- a hot header configured to provide a fluid flow path between an output of the primary heat exchanger tube to an input of the secondary heat exchanger;
- a perforated fluid flow plate disposed at least partially within the hot header, wherein the perforated fluid flow plate comprises an interior wall comprising:
  - a first portion distance from the secondary hear exchanger tubes, the first portion comprising a plurality of perforations that are misaligned relative to the secondary heat exchanger tubes; and
  - a second portion abutting one or more of the secondary heat exchanger tubes to provide a fluid flow path from the hot header to the one or more of the secondary heat exchanger tubes;
- an inducer motor configured to draw fluids from the primary heat exchanger tube to the secondary heat exchanger; and
- a circulation blower configured to selectively cause circulation air to flow from contact with the secondary heat exchanger to contact with the primary heat exchanger tube.

11. The furnace of claim 10, wherein the perforated fluid flow plate comprises a profile configured to minimize pooling of condensate within the hot header.

12. The furnace of claim 10, further comprising a seal configured to minimize pooling of condensate within the hot header.

13. The furnace of claim 10, further comprising a seal that extends over both the perforated fluid flow plate and a primary plate of the hot header.

14. The furnace of claim 13, wherein the primary plate of the hot header is associated with an output end of the primary heat exchanger tube.

15. The furnace of claim 14, further comprising a seal between a header plate of the secondary heat exchanger and the perforated fluid flow plate.

16. The furnace of claim 15, further comprising a seal between the primary plate of the hot header and the header plate of the secondary heat exchanger.

17. The furnace of claim 10, further comprising a gasket disposed within the perforated fluid flow plate.

18. The furnace of claim 17, wherein the gasket is configured to minimize pooling of condensate within a space bounded by the perforated fluid flow plate.

\* \* \* \* \*